United States Patent
Fredrickson

(10) Patent No.: US 6,493,162 B1
(45) Date of Patent: Dec. 10, 2002

(54) FRAME SYNCHRONIZATION FOR VITERBI DETECTOR

(75) Inventor: Lisa Fredrickson, Seattle, WA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/205,871

(22) Filed: Dec. 4, 1998

(Under 37 CFR 1.47)

Related U.S. Application Data

(60) Provisional application No. 60/067,673, filed on Dec. 5, 1997.

(51) Int. Cl.[7] .................................................. G11B 5/09
(52) U.S. Cl. .............................. 360/51; 360/46; 375/341
(58) Field of Search ...................... 360/46, 51; 375/262, 375/265, 341

(56) References Cited

U.S. PATENT DOCUMENTS

| | | | |
|---|---|---|---|
| 4,321,632 A | 3/1982 | Leis et al. ...................... 360/49 |
| 4,567,591 A | 1/1986 | Gray et al. ................... 370/109 |
| 4,571,734 A | 2/1986 | Dolivo et al. .................. 375/18 |
| 4,593,353 A | 6/1986 | Pickholtz ..................... 364/200 |
| 4,789,994 A | 12/1988 | Randall et al. ................ 375/12 |
| 5,036,408 A | 7/1991 | Leis et al. ..................... 360/48 |
| 5,081,651 A | 1/1992 | Kubo ........................... 375/94 |
| 5,121,262 A | 6/1992 | Squires et al. ................. 360/46 |
| 5,253,131 A | 10/1993 | Chevalier ................... 360/78.14 |
| 5,278,703 A | 1/1994 | Rub et al. ..................... 362/51 |
| 5,291,499 A | 3/1994 | Behrens et al. ............... 371/43 |
| 5,311,376 A | 5/1994 | Joan et al. ..................... 360/51 |
| 5,321,559 A | 6/1994 | Nguyen et al. ................ 360/46 |
| 5,341,249 A | 8/1994 | Abbott et al. ................. 360/46 |
| 5,341,386 A | 8/1994 | Shimoda et al. .............. 371/43 |
| 5,341,387 A | 8/1994 | Nguyen ........................ 371/45 |
| 5,349,608 A | 9/1994 | Graham et al. ............... 375/94 |
| 5,351,231 A * | 9/1994 | King et al. ............... 369/59.19 |
| 5,353,352 A | 10/1994 | Dent et al. ..................... 380/37 |
| 5,355,261 A | 10/1994 | Taratorin ..................... 360/53 |
| 5,383,064 A | 1/1995 | Harman ........................ 360/45 |
| 5,390,198 A | 2/1995 | Higgins ........................ 371/43 |
| 5,404,249 A | 4/1995 | Seki ............................. 360/48 |
| 5,434,807 A | 7/1995 | Yoshida ....................... 364/717 |
| 5,438,462 A | 8/1995 | Copolillo ..................... 360/53 |
| 5,440,588 A | 8/1995 | Murakami .................. 375/341 |
| 5,451,943 A | 9/1995 | Satomura ..................... 341/58 |
| 5,454,014 A | 9/1995 | Blaker et al. ............... 375/341 |
| 5,486,956 A | 1/1996 | Urata ........................... 360/65 |
| 5,502,735 A | 3/1996 | Cooper ........................ 371/43 |
| 5,521,767 A | 5/1996 | Weng et al. ................... 360/46 |
| 5,521,945 A | 5/1996 | Knudson .................... 375/341 |
| 5,539,774 A | 7/1996 | Nobakht et al. ............. 375/232 |
| 5,553,169 A | 9/1996 | Mizuoka ..................... 382/282 |

(List continued on next page.)

FOREIGN PATENT DOCUMENTS

| | | |
|---|---|---|
| EP | 0 087 907 | 9/1983 |
| EP | 0 581 717 A2 | 2/1994 |
| WO | WO 96/24932 | 8/1996 |

OTHER PUBLICATIONS

"Implementation of PRML in a Rigid Disk Drive" by J.D. Coker et al., *IEEE*, vol. 27, No. 6, Nov. 27, 1991, pp. 4538–4543.

(List continued on next page.)

*Primary Examiner*—Regina N. Holder
(74) *Attorney, Agent, or Firm*—Westman, Champlin & Kelly, P.A.

(57) ABSTRACT

A method and apparatus for synchronizing a Viterbi detector to data frames corresponding to code words read from of a medium is provided. A timing pattern and a synchronization pattern is provided, the detector is synchronized to the synchronization pattern based upon the timing pattern, the detector is further synchronized to the data frame based upon the synchronization pattern

29 Claims, 5 Drawing Sheets

U.S. PATENT DOCUMENTS

| | | | | |
|---|---|---|---|---|
| 5,576,707 A | | 11/1996 | Zook | 341/58 |
| 5,586,128 A | | 12/1996 | Chen | 371/43 |
| 5,588,011 A | | 12/1996 | Riggle | 371/43 |
| 5,617,425 A | | 4/1997 | Anderson | 371/10.2 |
| 5,717,535 A | | 2/1998 | French et al. | 360/53 |
| 5,771,127 A | | 6/1998 | Reed et al. | 360/51 |
| 5,909,331 A | * | 6/1999 | Behrens et al. | 360/51 |
| 5,970,104 A | * | 10/1999 | Zhong et al. | 375/341 |
| 6,023,386 A | * | 2/2000 | Reed et al. | 360/51 |

OTHER PUBLICATIONS

Lineu C. Barbosa, "Maximum Likelihood Sequence Estimators: A Geometric View," *IEEE Transactions on Information Theory*, vol. 35, No. 2, pp. 419–427, Mar. 1989.

Robert W. Hawley, Thu–ji Lin and Henry Samueli, "A 300 MHz Digital Double–Sideband to Single–Sideband Converter in 1 $\mu$m CMOS", *IEEE Journal of Solid–State Circuits*, vol. 30, No. 1, pp. 4–10, Jan. 1995.

Kelly J. Knudson, Jack K. Wolf and Laurence V. Milstein, "Dynamic Threshold Implementation of the MaximumLikelihood Detector for the EPR4 Channel", *Proceedings of Globecom 91, IEEE Communications Society*, pp. 2135–2139, Dec. 1991.

M. Kobayashi et al., "Beyond I um²/bit High Density Recording with Improved QAM Technique," *IEEE Transactions on Consumer Electronics*, vol. 37, No. 3, pp. 283–290, Aug. 1991.

Edward A. Lee and David G. Messerschmitt, *Digital Communication*, published by Kluwer Academic Publishers, pp. 275–286, 1988.

"A High Dimensional Signal Space Implementation of FDTS/DF" by Barrett Brickner and Jaekyun Moon, *IEEE Transactions on Magnetics*, vol. 32, No. 5, Sep. 1996, pp. 3941–3943.

"Maximum Transition Run Codes for Data Storage Systems" by Jaekyun Moon and Barrett Brickner, *IEEE Transactions on Magnetics*, vol. 32, No. 5, Sep. 1996, pp. 3992–3994.

"Signal Space Detectors for MTR–Coded Magnetic Recording Channels", by Hamid Shafiee et al., Manuscript received Jun. 16, 1997.

John G. Proakis, Ph.D., P.E., "Digital Communications" Second Edition, McGraw–Hill Book Company, 1985, pp. 554–561.

R. Behrens and A. Artstrong, "An advanced read/write channel for magnetic disk storage", Proceedings of the IEEE Asilomar Conference on Signals, Systems and Computer, 1992, pp. 956–960.

Brickner and J. Moon, "Designs of a rate 6/7 maximum transition run code", *IEEE Trans. Mag*, vol. 33 (5 pt 1) Sep. 1997, pp. 2749–2751.

Bliss, "An 8/9 rate time–varying trellis code for high density magnetic recording", Digests of Intermag 1997.

"Error Control Coding Fundamentals and Applications", by Shu Lin, University of Hawaii, Texas A&M University and Daniel J. Costello, Jr., Illinois Institute of Technology, (1983) pp. 528–531.

A. Patel, R. Rutledge and B. So, "Performance Data for a Six–Sample Look–Ahead, 1,7 ML Detection Channel", *IEEE Transactions on Magnetics*, vol. 29, No. 6, pp. 4012–4014, Nov. 1993.

J. Moon and B. Brickner, "Design of a Rate 5/6 Maximum Transition Run Code", Digests of Intermag, 1997.

J.W.M Bergmann, S.A. Rajput and F.A.M. van de Laar, "On The Use of Decision Feedback for Simplifying the Viterbi Detector", *Phillips Journal of Reseach*, vol. 42, No. 4, pp. 399–428, 1987.

R. Yamasaki et al., "A 1,7 code EEPR4 Read Channel IC with Analog Noise Whitened Detector", *Proceedings of ISSCC*, 1997, pp. 316–317.

L. Richard Carley et al., "A Low–Power Analog Sampled––Data VLSI Architecture for Equalization and FDTS/DF Detection", *IEEE Transaction on Magnetics*, vol. 31, No. 2, pp. 1202–1207, Mar. 1995.

* cited by examiner

FRAME SYNCHRONIZATION FOR VITERBI DETECTOR

REFERENCE TO RELATED APPLICATION

The present application claims priority from provisional application serial No. 60/067,673 filed on Dec. 5, 1997.

FIELD OF THE INVENTION

The present invention relates generally to information storage systems and, more particularly, to detection of data retrieved from storage in such systems

BACKGROUND OF THE INVENTION

Digital data magnetic recording, or storage and retrieval, systems store digital data by recording same in a moving magnetic media layer using a storage, or "write", electrical current-to-magnetic field transducer, or "head", positioned immediately adjacent thereto. The data is stored or written to the magnetic media by switching the direction of flow in an otherwise substantially constant magnitude write current that is established in coil windings in the write transducer in accordance with the data. Each write current direction transition results in a reversal of the magnetization direction, in that portion of the magnetic media just then passing by the transducer during this directional switching of the current flow, with respect to the magnetization direction in that media induced by the previous in the opposite direction. In one recording scheme, often termed non-return-to-zero inverted (NRZI), each magnetization direction reversal occurring over a short portion of the magnetic media moving past the transducer represents a binary number system digit "1", and the lack of any such reversals in that portion represents a binary digit "0".

Recovery of such recorded digital data is accomplished through positioning a retrieval, or "read" magnetic field-to-voltage transducer, (which may be the same as the storage transducer if both of these transducers rely on inductive coupling between the media fields and the transducer) or "head", is positioned to have the magnetic media, containing previously stored data, pass thereby. Such passing by of the media adjacent to the transducer permits the flux accompanying the magnetization reversal regions in that media either to induce a corresponding voltage pulse in forming an analog output read signal for that retrieval transducer or, alternatively, change a transducer circuit parameter to thereby provide such an output signal voltage pulse. In the coding scheme described above, each such voltage pulse in the read transducer output signal due to the reversal of magnetization directions between adjacent media portions is taken to represent a binary digit "1", and the absence of such a pulse in corresponding media portions is taken to represent a binary digit "0".

Digital data magnetic recording systems have used peak detection methods for the detection of such voltage pulses in the retrieved analog signal as the basis for digitizing this signal. Such methods are based on determining which peaks in that signal exceed a selected threshold to determine that a binary digit "1" related pulse occurred in the retrieved signal, and also use the times between those voltage pulses to reconstruct the timing information used in the preceding recording operation in which the data were stored in the magnetic media as described above. The analog retrieved signal is provided to a phase-locked loop forming a controlled oscillator, or a phase-locked oscillator or synchronizer, which produces an output timing signal, or "clock" signal, from the positions of the detected peaks in this analog retrieved signals Absolute time is not used in operating the data retrieval system portion since the speed of the magnetic media varies over time during both the storage operation and the retrieval operation to result in nonuniform time intervals, or nonuniform multiples thereof, occurring between the voltage pulses in the analog retrieved signal.

There is always a desire in magnetic recording systems to devote less of the magnetic media along a track therein to the storage of a bit to thereby permit increasing the density of the bits stored. The use of peak detection places a limit on the density of bits along a track because increasing that density beyond some point will lead to too much intersymbol interference which in turn leads to errors in the recovery of data using such peak detection methods. Because of this limit, recent increases in bit density along a track in a magnetic media have come with the acceptance of a controlled, or known, amount of intersymbol interference which, since known, allows detection of the pulses involved despite this interference. The read transducer analog output signal generated from the binary bits or symbols stored in the magnetic media is sampled with the resulting samples being converted to digital data, and the samples are taken at a rate which leads to more than one sample per pulse rather than the single sample per pulse which would be sufficient for peak detection if sampling was used therewith. Since each individual sample reflects only part of the pulse response, this process used in a system results in referring to such a system as a partial response system.

A digital data magnetic recording system typically comprises a bandpass data retrieval channel in that it is unable to transmit very low frequencies, and in that it has an upper frequency beyond which its transmission is also quite limited, and is often termed a Lorentzian channel in view of the resulting response to an isolated pulse. Thus, the channel, including any equalizer therein, should exhibit in passing a stream of data pulses therethrough a spectral characteristic having spectral nulls at zero frequency and at a frequency equal to half the symbol rate or pulse rate. Channels having an impulse response characteristic of the form $(1-D)(1+D)^k$ for such a stream have been found to provide such nulls but at the cost of accepting a substantial amount of intersymbol interference leading to the description of the channel as a "partial response system." Here, D is the unit delay operator, or $D=e^{j\omega T}$ where T is the bit period and $k \geq 1$ for the characteristic described. Such channel response characteristics have integer coefficients resulting in the sampled channel output symbols also having only integer values.

Although there are a number of possible alternative partial response system arrangements, there is substantial value in choosing a channel characteristic of the above form that has the smallest value for n that is possible for the data to be transmitted in the channel. Increasing the value of n leads to increased intersymbol interference resulting in more output symbol values thereby reducing the signal-to noise ratio and increasing the necessary detector complexity and performance requirements. The simplest partial response system with the desired characteristics results from k being set equal to one to yield a channel characteristic of $(1-D)(1+D)=1-D^2$ that is known as a class 4 partial response system, and has been typically used previously in magnetic digital data recording Systems. Such a response is obtained by providing an overall channel and filter response equal to that of the sum of two opposite polarity Nyquist channel impulse responses separated in time by two sample intervals. Such an arrangement will lead to a filter analog output signal from which ideally can be obtained three alternative possible output symbol sample values of −1, 0 and 1 for an input signal based on binary recorded data if sampled at appropriate instants.

A range of lineal bit representation densities along a track in the magnetic media, leading to a range of data pulse rates for retrieved data, can be accommodated by providing an equalizer in the channel suited to the density chosen. Such an equalizer operates by changing the effective channel characteristic as to keep the output symbol samples at the proper integer values. However, as the lineal density is increased along the tracks in the magnetic media a point is reached where the noise enhancement provided by the equalizer becomes unacceptable. This situation, along with other considerations, requires going to a greater value for n for further density increases to allow a reduction in the transmittals at frequency values.

The next higher values for k are 2 and 3, and these values are appropriate at significantly higher user densities, i.e. when $pw_{50}$/Tuser is at 2.4 or above where $pw_{50}$ is the pulse width in time for an isolated magnetic pulse between its half peak amplitude values, and Tuser is the time per user bit which is equal to the bit time T divided by R, the code rate for any modulation code being used. When k 2, the channel is referred to as an extended class 4 partial response system which is usually written as $E^2PR4$. When k=3, the channel is usually written as $E^2PR4$. A read transducer analog output signal provided through any kind of a data retrieval channel is subject to containing errors therein as a result due to noise, timing errors, gain errors, channel asymmetries and the like encountered in the course of retrieval. As opposed to attempting to determine individually the value represented by every pulse in the read signal as in peak detection, maximum likelihood detection of sequences of such samples is used instead involving estimating which of several possible transmitted symbol sequences caused the received sample sequence. This determination is typically based on finding the minimum mean squared error between these received samples and each of the possible symbol sequences that may have generated these samples, and then choosing that symbol sequence giving the smallest such error.

The detection process over time for a channel receiving data can be illustrated by a multiple state trellis diagram showing the possible sequence of detection system states resulting from transitions therebetween that can evolve over time. States are shown in the diagram after each corresponding sample interval and the transitions between these states which can occur on obtaining the next data symbol after the subsequent sample interval are shown leading to the next states. Each transition is represented by an arrow, or branch, usually with a pair of values in parentheses adjacent thereto showing a possible next expected data sample after being in the preceding state, and the corresponding data output symbol value on the right. Such a trellis diagram is shown assuming the detection system was initially in some state and is depicted for a sequence of samples of arbitrary length, often for the length of a code word or block, the diagram having each sample interval marked below the corresponding states the system could be in at that instant. A sequence of contiguous branches from the beginning to the end is a path through the diagram corresponding to a possible input sequence of data symbol values.

There will be some correct state sequence, or path, through the trellis diagram representing the detection process for the data symbol sequence recovered from storage in the magnetic media, and there will be a state sequence, or path, through the trellis diagram reflecting the selections of the detection system using the Viterbi algorithm. Due to conditions in the retrieval channel, errors can occur from time to time as indicated above so that these two paths in the trellis diagram will correspondingly separate and thereafter merge together again. Each of such occurrences is termed an error event of a length depending on how many states occur between such a separation and the subsequent remerging of the paths.

Such a trellis diagram representing a detector is usually based on coded sequences of data which may represent multiple codings of that data for different purposes. Modulation coding is usually used because such use can compensate for shortcomings of the channel such as nonlinearities present therein or to aid the operation of the detection system such as aiding the recovery of a clocking signal from the retrieved data to be used in coordinating the retrieval system. In addition, such coding can provide increased distances between code words to aid the data retrieval process typically by eliminating the most common error events. Analysis of an equalized channel having initially retrieved signals introduced into a Lorentzian channel subject to white, Gaussian noise all passed through a low pass filter to an equalizer and a sampler shows the smallest distance, and so most common, error events is the failure to detect data sequences that are stored in the magnetic media as three or more consecutive magnetization direction transitions, i.e. three or more stored consecutive digital binary values of "1".

Codes have been devised that eliminate such error events both for $E^2PR4$ and $E^2PR4$ equalized channels. Use of such codes in a magnetic data storage and retrieval system has often been found to also require use of a Viterbi algorithm based periodically time-varying characteristic data detector for which the characterizing trellis will have selected state transition edges omitted or added as a function of time to reduce the possibilities of errors occurring in the detection process. At higher data retrieval rates possible in an $E^2PR4$ equalized channel, there are advantages in using a radix-4 detector. In this circumstance in which consecutive pairs of channel samples are received by the detector with the members of each pair processed concurrently by that detector. Such a radix-4 detector, (providing detection processing for consecutive pairs of samples of the data retrieval channel equalized analog signal) has each branch in the detector trellis representation being representative of two such samples (noiseless) and the state transition result for the corresponding two channel input bit values. The use of a Viterbi algorithm based periodically time-varying characteristic radix-4 detector leads to not only needing to have a time-varying detector operated with proper timing with respect to the code blocks but also with proper phasing with respect to each sample pair member. Hence, a synchronizer is desirable for operation of the detector which enables the detector to start in a known state at a selected time with respect to the timing cycle used in its periodic variation and to be in phase with the data samples.

SUMMARY OF THE INVENTION

A method and apparatus for synchronizing a Viterbi detector to data frames corresponding to code words read from a medium is provided. The method includes providing a timing pattern, providing a synchronization pattern, synchronizing the detector based upon the timing pattern; and synchronizing the detector to the data frame based upon the synchronization pattern.

DETAILED DESCRIPTION OF THE PREFERRED EMBODIMENTS

Figure 1:
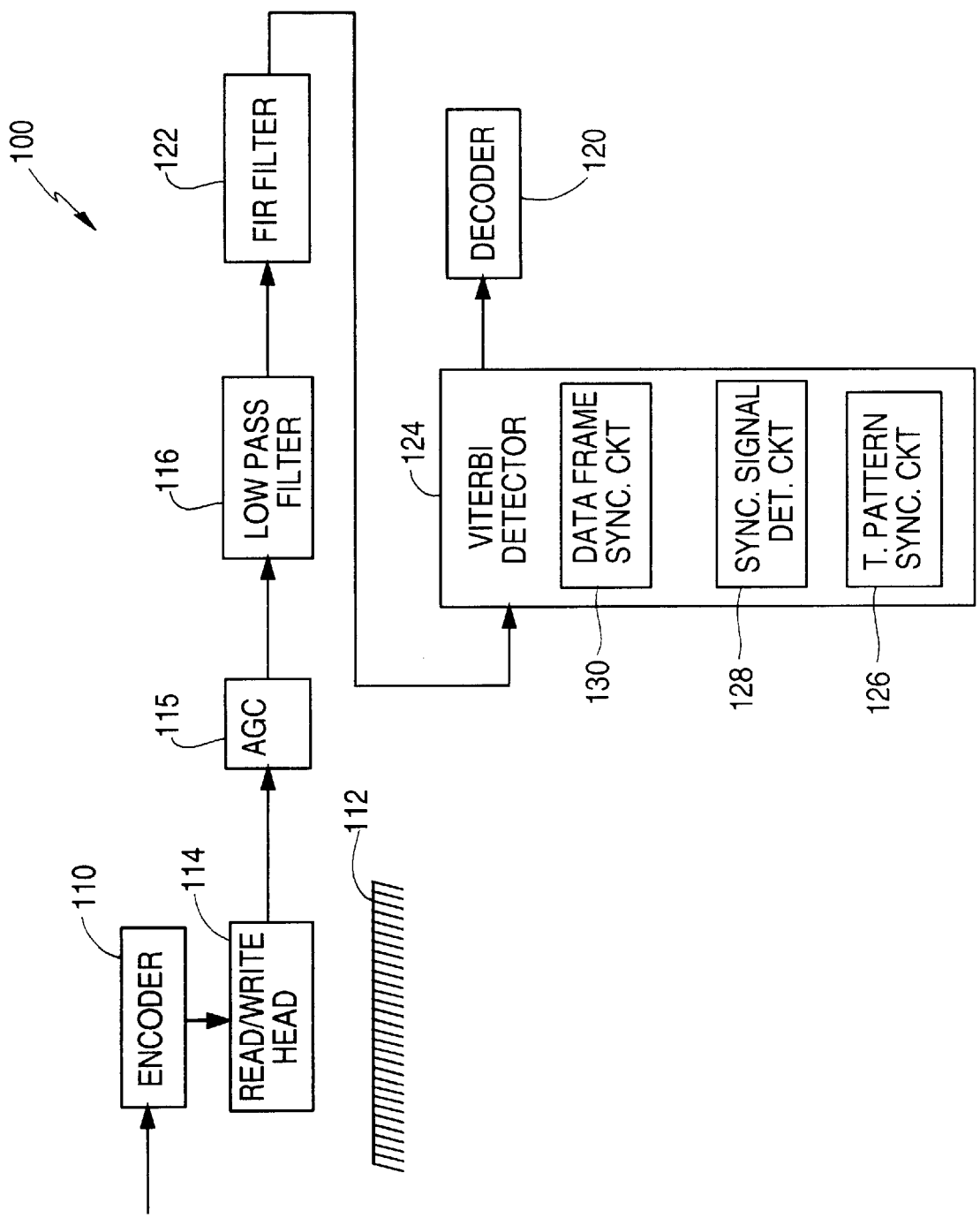
FIG. 1 is a simplified block diagram of a data storage system in accordance with the present invention.

Referring now to FIG. 1, a simplified block diagram of a data storage system 100 according to the present invention is shown. System 100 includes encoder 110, disc 112, read/write head 114, automatic gain control (AGC) circuit 115, low pass filter 116, finite impulse response (FIR) filter 122, Viterbi detector 124 and decoder 120 Viterbi detector 124 includes timing pattern synchronization circuitry 126, synchronization signal detection circuitry 128 and data frame synchronization circuitry 130 in accordance with the invention and which are described below in more detail. System 100 may also include an analog-to-digital (A/D) converter as well. An actuator assembly (not shown) typically holds read/write head 114 in position over a surface of disc 112. The actuator assembly includes actuator arms which are rigidly coupled to a head gimbal assembly. The head gimbal assembly, in turn, includes a load beam, or flexure arm, rigidly coupled to the actuator arm at a first end thereof, and to a gimbal at a second end thereof. The gimbal is coupled to an air bearing which supports read/write head 114 above the corresponding surface of disc 112 for accessing data within tracks on the surface of disc 112.

In operation, a drive controller associated with the disc drive containing read channel 110 typically receives a command signal from a host system which indicates that a certain portion of disc 112 is to be accessed. In response to the command signal, the drive controller provides a servo control processor with a position signal which indicates a particular cylinder over which the actuator is to position read/write head 114. The servo control processor converts the position signal into an analog signal which is amplified and provided to the actuator assembly. In response to the analog position signal, the actuator assembly positions read/write head 114 over a desired track.

If a write operation is to be performed, data is provided by the drive controller to encoder 110 which encodes the data according to a predetermined code. Such a code may include constraints such as a maximum transition run (MTR) length code constraint of any desirable size. The code constraints may also be time varying. The encoded data is then provided, in the form of a write signal, to read/write head 114. Read/write head 114 then operates to write information on the surface of disc 112 which is indicative of the data encoded in the write signal.

If a read operation is to be executed, read/write head 114 develops a read signal indicative of information in the track over which read/write head 114 is positioned. The read signal is provided to AGC circuit 115 which maintains the signal within an expected range and provides it to low pass filter 116. Low pass filter 116 filters out high frequency components and provides the signal to FIR filter 122. FIR filter 122 is provided to equalize the input signal pulses into a target response (pulses which have fewer non-zero values).

Normal operation of the Viterbi detector 124 is more easily understood using a trellis diagram, which is a type of state machine diagram drawn with discrete time intervals being depicted by a vertically oriented group of states. In such a system, there is no intersymbol interference between adjacent pulses at the output. Assuming a user input bit of zero represents no transition or flux reversal read from the disc, and a bit of one represents a transition (assuming a non-return-to-zero inverted coding system), and assuming that the peak sample value of the equalized transition is one, then an input of zero provides an output of zero. An input of one provides an output of either one or minus one depending on the polarity of the last transition. In other words, each time there is a one in the input sequence, the direction of the write current changes. Given the above system, it is clear that the polarities of transitions must alternate. In another illustrative system, a non-return-to-zero modulation is used. In such a non-return-to-zero system, a 1 corresponds to a high and a 0 corresponds to a low.

Viterbi detector 124 is a detector which detects bits coming off of the medium 112. The Viterbi detector 124 takes the measured value (such as voltage) from the head 114 and subtracts it from the expected value, where the bit is expected to be a 1 or a 0, and where the prior bits were different combinations of bits. In other words, the magnetic channel has properties such that bits recorded three or four time periods previously affect the value of a current bit (whether the current bit is a one or a zero). Thus, if the prior three bits were 101, and the current bit is a 1, there would be an expected voltage value. Similarly, if the three prior bits were all 0's, and the current bit was a one, there would be a different expected voltage value. The Viterbi algorithm adds up the differences between the actual measured value and each of the hypothetical, or possible values, over a time period. The particular sequence of bits which is associated with the smallest difference is typically chosen as the most likely sequence of bits which was actually read from the disc.

Viterbi detector 124 can thus be represented as a state machine diagram, with discrete time as an additional component of the diagram. Each state in the state diagram is written, vertically arranged, once each sampling interval. The states are connected by branches which represent state transitions from the originating state to the subsequent state. This is called a trellis diagram. Each state represents a potential sequence of bits. Where the Viterbi detector is used to detect bits written to a channel modeled as an $E^2PR4$ channel, for instance, the bits written 4 time intervals previously affect the current bit. The Viterbi algorithm steps through the trellis diagram and calculates the distance between the measured value and the expected value corresponding to each state. The Viterbi algorithm accumulates these distances, for each potential path through the trellis diagram. Some Viterbi algorithms are provided with pruning mechanisms by which, if a certain value exceeds a predetermined threshold, the path associated with that value is removed from further consideration.

During operation, the Viterbi algorithm may be tracking a single path through the trellis diagram. At some detector interval, the distance between two subsequent states (from one originating state) may be the same. In that case, the path is said to diverge from a single originating state. Both paths are then tracked through the Viterbi trellis. At some later interval, the two paths may again remerge to a single subsequent state. At that time, the Viterbi algorithm can typically determine which of the paths is more likely to be correct, based upon the distance from the measured value, which has been accumulated for each path. Also, the divergence of a single path from a single originating state to two subsequent states represents an error event. In other words, from a single originating state, two subsequent states are possible. This indicates that, necessarily, one of the subsequent states is wrong. When the two subsequent paths never remerge into a single subsequent state, the error event is referred to as "an open error event." However, where the two paths do eventually remerge into a single subsequent state, the error event is referred to as "a closed error event."

One measure of robustness of a Viterbi detector relates to distance between two paths. A Viterbi detector is deemed to be relatively robust where the distance between two paths representing an error event accumulate a great deal of distance. The distance is represented by the square of the error. The square of the error can be obtained by subtracting each value corresponding to a state transition, from the corresponding value in the state transition in the other of the paths, squaring the result of the subtraction, and adding the squared results for each term.

It is preferable that the two diverging paths continue to gain distance therebetween because this tends to indicate that one of the paths is diverging further and further from the actual measured value so that the Viterbi detector will find it easier to distinguish between the correct and incorrect paths when the paths eventually remerge, or when the Viterbi detector simply outputs a decision.

Coding techniques have been developed which can be used to encode data into codewords. The codes are developed to increase the distance between two codewords. Similarly, some quite recent codes are time varying. For example, the codes may allow three consecutive transitions every other sampling interval, but disallow them in the remaining sample intervals. Such constraints on the code can be enforced in the Viterbi detector. This can be thought of as removing some of the branches from the Viterbi detector trellis, since transitions between two states may be simply disallowed, given the code constraints. With time varying code constraints, branches in the trellis diagram must be removed and replaced in a time varying fashion. This can be visualized as traveling from left to right through time, across the trellis diagram and at various times, certain portions of the trellis diagram neck down or narrow, or simply contain a large number of removed branches, while the remainder of the trellis diagram contains more branches between states.

A time varying trellis must be synchronized with the received codeword frames so that the trellis has the correct structure to enforce the code constraints of the given code, in a time varying manner. The present invention is directed to providing a synchronizer, and a synchronizing code, prior to transmitting user data, so that the Viterbi detector can be synchronized to the codeword frames to accomplish correct detection.

Because, as indicated above, absolute time is not used in operating detector 124, the timing information used in the preceding recording operation must be reconstructed. A disc typically provides a timing preamble signal prior to the data retrieval signal for training the data retrieval phase locked oscillator. An a non-return-to-zero timing pattern (T pattern) is as follows:

$$a(D)=\{0,0,1,1,0,0,1,1,0,0,1,1,\ldots\}. \qquad \text{Eq. 1}$$

Retrieval of this sequence from the disk in an $E^2PR4$ equalized retrieval channel results in its interacting with a channel characteristic of:

$$P(D)=1+2D-2D^3-D^4 \qquad \text{Eq. 2}$$

where D is a delay operator, to yield a channel response of:

$$y_i=a_i+2a_{i-1}-2a_{i-3}-a_{i-4} \qquad \text{Eq. 3}$$

This results in the following noiseless samples being observed:

$$y(D)=\{2, -2, -2,2,2, -2, -2,2,2, -2, -2,2, \ldots\} \qquad \text{Eq. 4}$$

Figure 2:
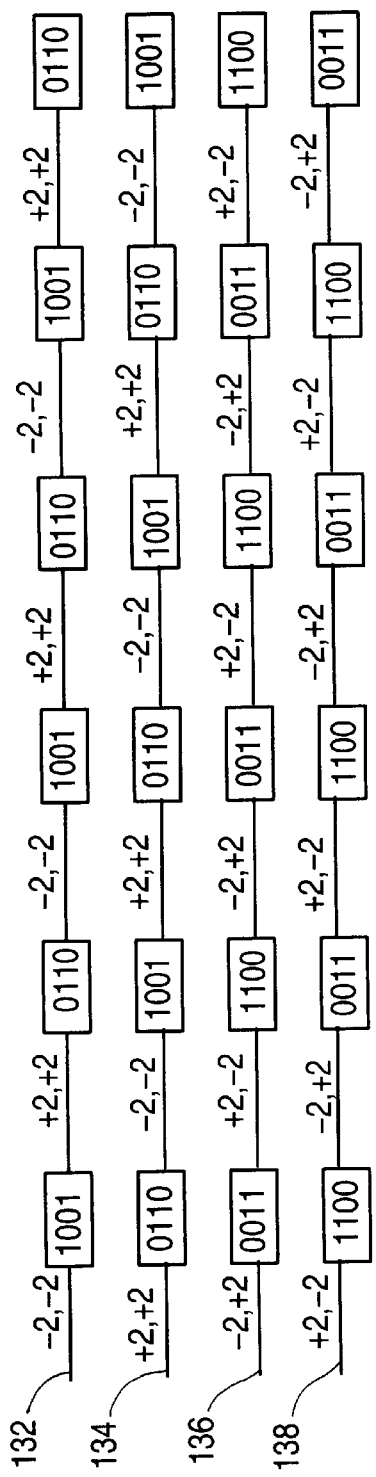
FIG. 2 shows four possible phases of a T pattern or timing preamble.

Using a radix-4 Viterbi detector, each processing step uses a pair of samples. Thus, the detector operates at half of the bit sample rate. In a radix-4 detector, pairs of bits are processed at each iteration of the detector, with each branch representing two noiseless samples and state transitions spanning two channel input bits. A radix-4 detector wakes up observing one of four phases of the timing pattern (which can be recorded as part of a data preamble) labeled 132, 134, 136 and 138 in FIG. 2. Each state in the detector illustrated in FIG. 2 is labeled with the hypothetical last four a non-return-to--zero channel input bits at that time. In accordance with one illustrative embodiment of the present invention, the detector will be aligned with the T pattern in such a way that pairs of samples with opposite polarity are processed and the T pattern path through the detector is identified.

This can be achieved in a robust manner using two up-down counters which are initially set to zero. The direction of the first counter is the exclusive-or (XOR) of the signs of the pair of samples to be processed. If the samples have opposing polarity, the counter counts up. If the samples do not have opposing polarity the counter counts down. A threshold value M is used. If the counter reaches M, pairs of samples with opposite polarities are being processed. If, on the other hand, the counter reaches –M, pairs of samples with the same polarity are being processed. A time delay of a sample period can thus be inserted or deleted in the sample path to align the detector such that pairs of opposite polarity in the T pattern are being processed.

Once it is determined that samples of opposite polarities are being processed, the signs of those samples must be identified and the signs of the first samples in each pair being processed in the T pattern must alternate. The sign of the first sample in each sample pair is determined as follows. A hypothetical sign alternation of samples is assumed by toggling a flip-flop operating at half the bit rate. The direction of a second up-down counter is determined by the correlation of the assumed sign and the actual sign of the first sample in each pair. If the signs match, the second counter counts up. If the signs do not match, the second counter counts down. When the first counter reaches the threshold, the combination of the sign of the second counter's output and the sign of the threshold reached by the first counter determines which phase, 132, 134, 136 and 138 of the T pattern is being observed.

Figure 4:
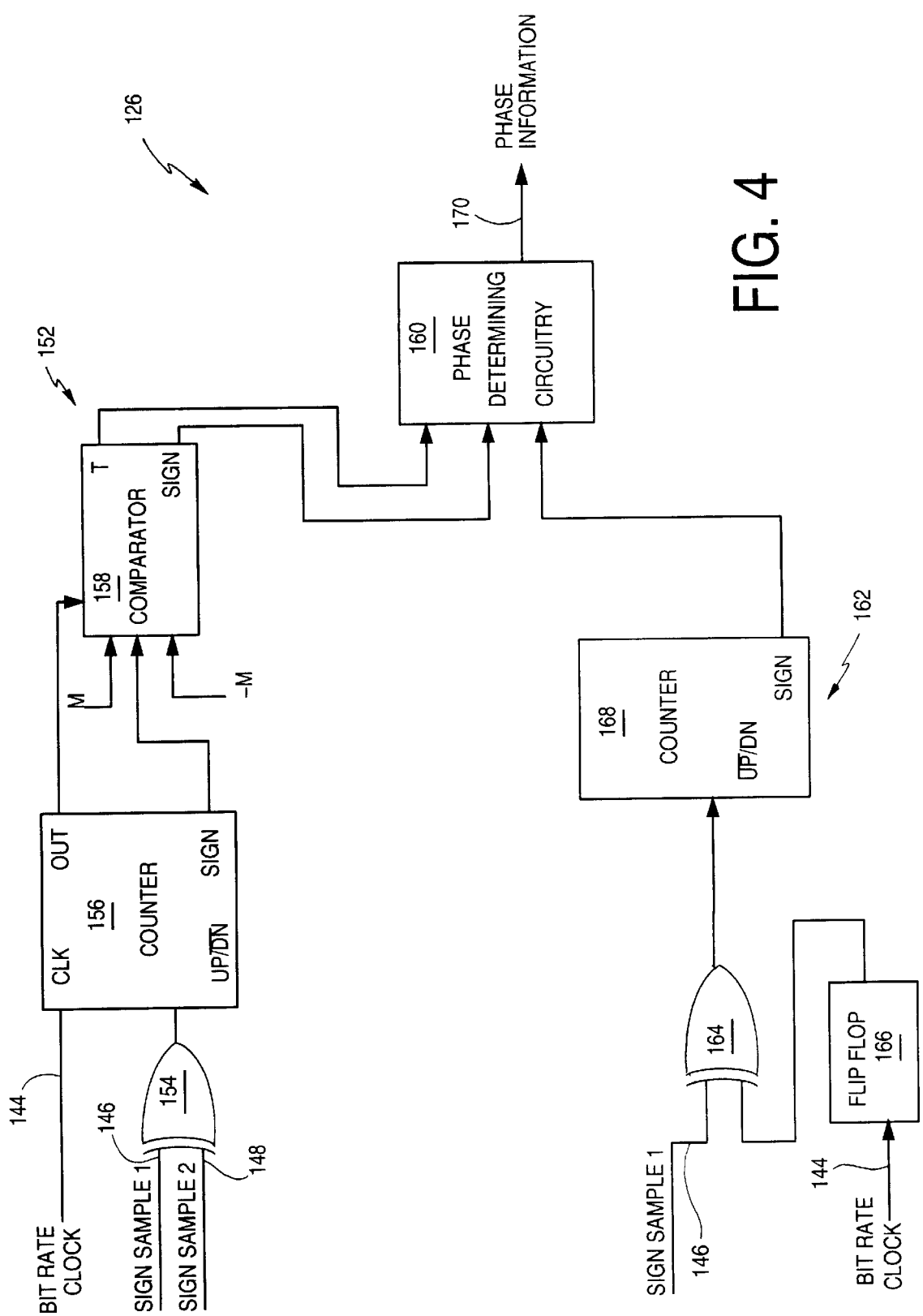
FIG. 4 is a simplified circuit diagram for use in synchronizing to a timing pattern in accordance with the present invention.

FIG. 4 is a simplified circuit diagram of timing pattern synchronization circuitry 126 for detecting the phase of the T pattern as set forth above. Circuitry 126 includes polarity detection circuitry 152 having exclusive-or (XOR) gate 154, counter 156 and comparitor 158. Gate 154 receives the sign of sample 1 (146) and the sign of sample 2 (148), a 0 representing a negative sign and a 1 representing a positive sign. The output of gate 154 is provided to an UP/$\overline{\text{DOWN}}$ input. A clock input of counter 156 is connected to a bit rate clock 144 and counter 156 provides an output indicative of its current count along with a sign output indicating the sign of the current count. The outputs from counter 156 are provided to comparator 158 which compares the output the thresholds M and −M. Comparator 158 provides two outputs, T and SIGN. The T output indicates that a threshold value (M or −M) has been reached and the SIGN output indicates which threshold value is reached. These outputs are provided to phase detection circuitry 160.

Circuitry 126 further includes-sign identification circuitry 162 having exclusive or (XOR) gate 164, flip/flop 166 and counter 168. Flip/flop 166 receives the bit rate clock 144 and provides an output which alternates at a rate of one half of the bit rate clock. This output is provided to gate 164 along with the sign of sample 1 (146). The output of flip/flop 166 is an assumed or hypothetical sign. The direction of counter 168 is determined by the exclusive-or of the sign of sample 1 and the assumed sign of sample 1 (146). If the signs match, the counter counts up and if the signs do not match, the counter counts down. The output of counter 168 is provided to phase detection circuitry 160.

Phase detection circuitry 160 inserts a timing offset of 1 bit if the output of comparitor 158 indicates that a threshold of −M has been reached. This is used to align the T pattern such that alternating sample pairs of opposite polarities are being processed. Phase determination circuitry uses this information along with the output from counter 168 to provide a phase information output 170 which indicates which phase (132, 134, 136 and 138 shown in FIG. 2) of the T pattern is being observed.

Figure 3:
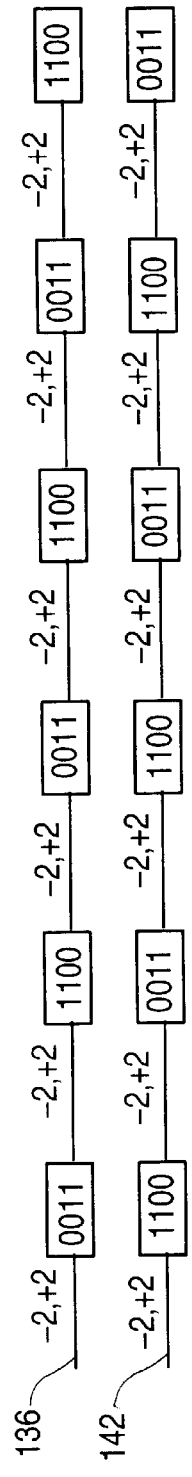
FIG. 3 shows possible phases of the T pattern of FIG. 1 after sample alignment.

Once the phase of the T pattern is determined, and realigned as necessary, the T pattern is shown as one of two paths through the detector illustrated in FIG. 3. The second counter 168 value, and knowledge of any realignment, determine which of the two paths, C or D, is observed.

Figure 5:
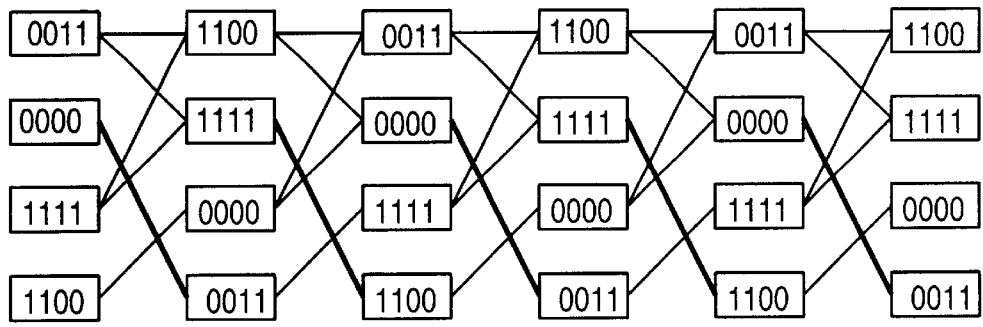
FIG. 5 is a trellis which shows the biasing of a Viterbi detector for frame synchronization for one of the paths shown in FIG. 3.
Figure 6:
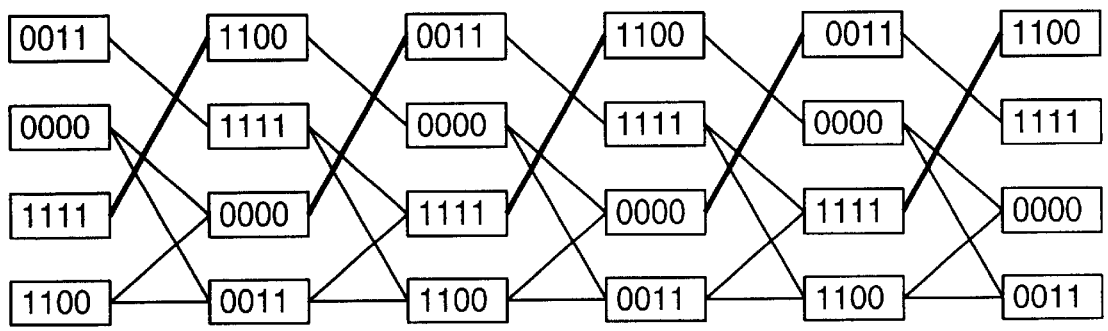
FIG. 6 is a trellis which shows the biasing of a Viterbi detector for frame synchronization for one of the paths shown in FIG. 3.

Once the alignment and polarity of the T signal is determined as described above, frame synchronization to the T pattern can be achieved through synchronization signal detection circuitry 128 and data from synchronization circuitry 130. FIG. S shows biasing of Viterbi detector 124 for frame synchronization given that the T pattern, after sample realignment, follows path C in FIG. 3. Similarly, FIG. 6 shows biasing of the Viterbi detector for frame synchronization given that the T pattern, after sample realignment, follows path D shown in FIG. 3. In FIGS. 5 and 6, it is assumed that:

i) the allowed paths for the various states are as shown in FIGS. 5 and 6;

ii) the path selection is made either by two-way comparison or by prebiasing, as shown;

iii) path metrics are updated for selected paths;

iv) the most recent bits entering the path memory for all unbolded paths are 00;

v) the most recent bits entering the path memory for the bold paths are 01; and vi) path memories for the remaining bits are updated via register exchange.

The trellis diagrams illustrated in FIGS. 5 and 6 are biased such that the Viterbi detector will be synchronized with the data codeword frame. After synchronization, frame synchronization circuitry 130 aligns the Viterbi detector to accurately detect data from the code words.

Figure 7:
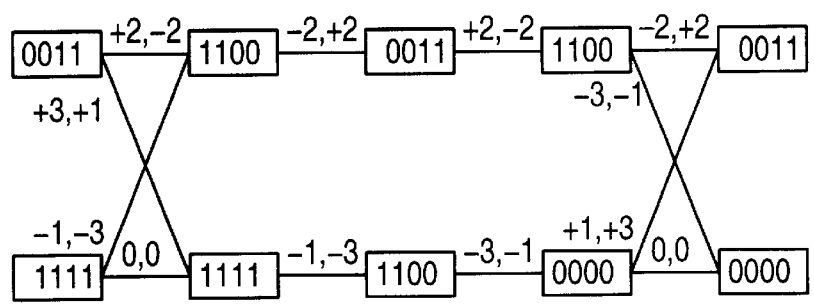
FIG. 7 shows the selection of paths through the trellis of FIG. 4 for a possible error event.

The biasing of the Viterbi detector illustrated in FIGS. 5 and 6 provides particularly robust feature detection. In other words, properly detecting a distinguishing feature is far more likely than an erroneous detection. This is further illustrated in FIG. 7. FIG. 7 illustrates a selection of paths in the frame synchronization trellis illustrated in FIG. 3. Paths may be described in terms of distances. The two paths initially diverging from a common state on the left hand side of FIG. 7 have a sum of squared differences in the first two sample values of 10. For each of the next two pairs of samples, the sum of squared differences in sample values is 26. If the paths remerge to a common state on the right hand side, they have a sum of squared differences in the last two sample values of 10. The total distance between the remerged paths corresponding to a closed error event is $d^2=72$. Open error events resulting from a failure to remerge accumulate $d^2=70$ by the right hand side of FIG. 6 and accumulate an additional $d^2=52$ in the next four samples. Further, in the case of a drop out with all zero samples, the T pattern path is closest to the observed samples. The accumulating distance is indicative of robustness. After being matched to the T-pattern, the Viterbi trellis must be synchronized to the codeword frames. In order to do this, the present invention utilizes a synchronization frame characterized by distinguishing features. In one embodiment, distinguishing features are identified by four bits equal to an inversion of the corresponding four bits of the T pattern. The biasing of the detector forces a distinguishing feature that is in the synch sequence (or synch frame) to be preceeded and succeeded by at least two channel input bits which are the same corresponding bits in the T pattern. The distinguishing feature of the non-T path in FIGS. 5 and 6 can be defined as the inclusion of the bold path designated by a 1 in the path memory. This distinguishing feature arrangement is quite robust. For instance, the robustness of this distinguishing feature can be compared to a trellis coded $E^2PR4$ channel, with distance $d^2=10$. The relative detection signal to noise ratio for this feature as compared to user bit channel events is:

$$ACG = 10 \cdot \log\left(\frac{d^2_{feature\text{-}event}}{d^2_{channel\text{-}event}}\right) \text{ dB} = 8.57 \text{ dB} \quad \text{Eq. 5}$$

on an ideal $E^2PR4$ channel with white noise. Thus, the features of the synch frame pattern are highly robust, having a probability of error which is substantially less than that of data detection at a reasonable signal to noise ratio. Consider the following sequences:

T: 0011001100110011001100110011001100
S: 0011001111000011000011110000111110000
T⊕S: 0000000011110000001111000011110011110
H: 00000000001000000000010000000100000100

In the above sequences, T is the detector phasing of the preamble or (T) pattern in a non-return-to-zero channel input notation. S represents a possible frame synchronization sequence which is preceded by eight bits of preamble. T ⊕ S is the XOR of the two sequences T and S. H represents the path history contents of state 000 after noiseless detection of the synchronization sequence.

S contains four distinguishing features as described above. The first eight bits of S directly correspond to the first eight bits of the timing pattern (preamble, T-pattern), repeated. The following sequence includes four distinguishing features. In this example, the distinguishing features each comprise four bits which are inverted from the corresponding timing pattern. Thus, each of the four distinguishing features conforms to the desired 2 by 2 alignment of the detector, and the features are separated by at least two bits which directly correspond to the timing preamble.

Robustness of the sequence can be confirmed by a ranking calculation. For example, let $H^{(n)}$ represent the path history contents for state 0000 in noiseless detection of the synchronization sequence at time n, i.e.,:

$$H^{(n)} = (h_{n-L+1}, h_{n-L+2}, \ldots, h_n) \qquad \text{Eq. 6}$$

where L is the length of the path history. Further, suppose that the synchronization sequence ends at time N. Now, define the ranking R, of the current path history content to time N as:

$$R = \sum_{i=-L+1}^{0} h_{n-i} h_{N-i} \qquad \text{Eq. 7}$$

The ranking of the noiseless synchronization sequence at time N, therefore, is the same as the number of features, and the ranking of the noiseless timing preamble is zero. In order to have a robust synchronization sequence, it is desirable that the ranking of noiseless detection of the synchronization sequence at times n<N be small. For this synchronization sequence, the ranking as a function of time is shown below in Table 1:

TABLE 1

| N − n | Ranking |
|---|---|
| >24 | 0 |
| 24 | 1 |
| 22 | 0 |
| 20 | 0 |
| 18 | 1 |
| 16 | 0 |
| 14 | 1 |
| 12 | 0 |
| 10 | 1 |
| 8 | 1 |
| 6 | 1 |
| 4 | 0 |
| 2 | 0 |
| 0 | 4 |

Table 1 illustrates that the noiseless ranking is at most 1 prior to the correct synchronization time, N. Now, let V be the maximum number of features observed prior to time N. In order to make the synchronization detector robust against early fault synch, a threshold W greater than V is used. If the ranking observed is W, then synchronization is declared.

Now, suppose that the most probable feature misdetection probability is p, and let X greater than W be the number of features in the synch pattern. The difference, W−V is the minimum number of falsely detected features that could cause a false early synch. If V features are correctly observed, than an additional W−V features are falsely observed in the remaining X−V locations. The probability of this is:

$$P[\text{early synchronization}] \leq \binom{X-V}{W-V} p^{W-V} \qquad \text{Eq. 8}$$

where $$\binom{i}{j} = \frac{i!}{j!(i-j)!} \qquad \text{Eq. 9}$$

is the combinatorial "i choose j" function.

The difference X−W+1 is the number of features at time N that would have to be falsely missed in order to miss the synchronization pattern. The probability of this is:

$$P[\text{missed synchronization}] \leq p^{X-W+1} \qquad \text{Eq. 10}$$

In this example, V=1, W=3 and X=4, meaning that two misdetected features are required for a frame synchronization error.

The total length of the example synchronization sequence plus a two bit pad, is 30 bits. For a given X and V, an exhaustive search can be determined to find a list of sequences with the desired properties of a given length. The minimum number of bits for four features as described with V=1 is 30 bits, consisting of 28 bits and a two bit pad. Table 2 lists all possible 30 bit sequences with these properties:

Exhaustive List of Possible X=4, V=1, 28 Bit+2 Pad Bit Sequences

TABLE 2

| phase of T pattern | 001100110011001100110011001100 |
|---|---|
| possible X=4, V=1 sequences | 110000110000111100001111110000 |
| | 110000111100001100001111110000 |
| | 110000110000111111000011110000 |
| | 110000001111001111000011110000 |
| | 110000111100000011110011110000 |
| | 110000001111000011110011110000 |

In this discussion, it is assumed that the writing state machine outputs the synchronization at a known phase of the T pattern, and that the channel is non-inverting. If the channel polarity is unknown, however, it is possible that the synch pattern is inverted The only difference in the detection algorithm is that the path memory for state 1111 should be monitored in this case.

After frame synchronization, detection must be initiated. Two techniques of starting the detector for data detection are considered. In the first technique, it is assumed that the channel polarity is learned through earlier frame synchronization detection. The channel can be inverted in digital hardware by inverting sample values. If this synchronization pattern is consistently detected in state 1111 when the desired state is 0000, a flag is set which can be monitored through a serial port. The controller decides if the channel needs to be logically inverted to start data detection in the desired state.

Once the starting state is known, the detector is biased for the first four bits of data detection so that all paths through the detector originate in the starting state. The starting state can be forced as described above, or two alternative start-ups for data detection an be provided. One start-up alternative is for starting state 0000, and one is for starting 1111. Thus, once a synchronization frame is detected, the system can either jump to a portion of the trellis, (or a portion of software code that implements the trellis) that starts with the state 0000 or the state 11111 whichever corresponds to the particular channel that is being used. The selection of the initial state is determined by the ending state of the synchronization sequence.

Figure 8:
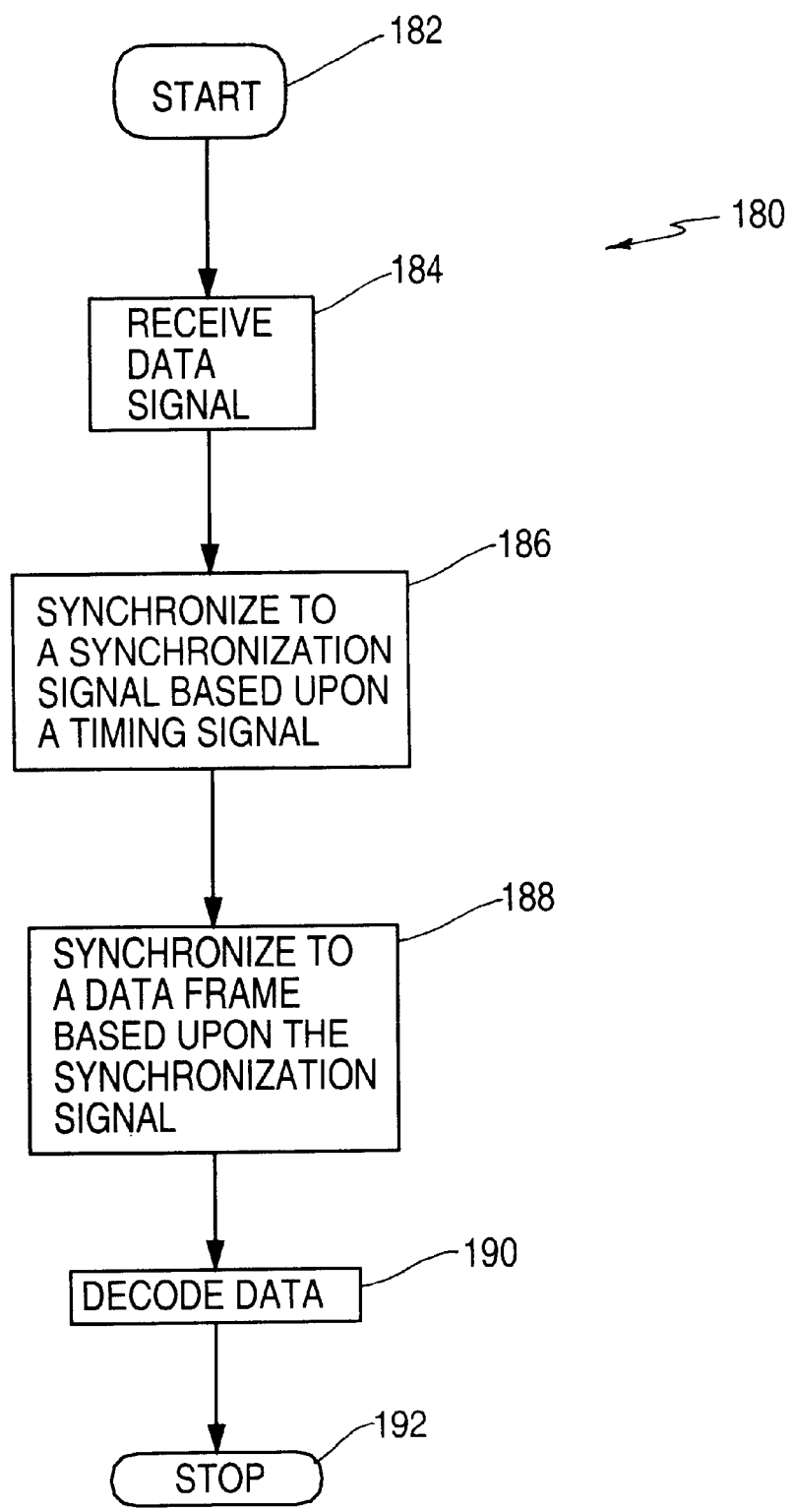
FIG. 8 is a simplified flow chart in accordance with one embodiment of the present invention.

FIG. 8 is a simplified flow chart 180 which illustrates steps in accordance with the present invention. Flow chart 180 starts at start block 182. At block 184, a data signal is received. As described above, the data signal includes a timing signal and a synchronization signal. At block 186, the Viterbi detector is synchronized to the synchronization signal based upon the timing signal. At block 188, the Viterbi detector is synchronized to a data frame in the data signal based upon the synchronization signal. Data is decoded by the Viterbi detector at block 190 and the flow chart ends at 192. As will be apparent to those skilled in the art, in flow chart 180, the various steps may be performed simultaneously. That is, the data signal is being received and the Viterbi detector is being synchronized to the timing signal and the synchronization signal while simultaneously decoding data.

The present invention includes a method of synchronizing a Viterbi detector 124 to data frames corresponding to codewords read from a medium 112. The method includes providing a timing pattern (Equation 1) and providing a synchronization pattern (Table 2). The method further includes synchronizing the Viterbi detector 124 to the synchronization pattern (Table 2) based upon the timing pattern (Equation 1). Further, the Viterbi detector 124 is synchronized to the data frame based upon the synchronization pattern (Table 2). Further, an apparatus is provided for synchronizing a Viterbi detector 124 to a time varying data code which includes timing pattern synchronization circuitry 126 adapted to determine a phase (132, 134, 136 and 138) of a timing pattern (Equation 1) in the data code. Synchronization signal detection circuitry 128 identifies a synchronization signal (Table 2) in the data based upon the phase (132, 134, 136 and 138) of the timing pattern (Equation 1). Data frame synchronization circuitry (130) is adapted to synchronize the Viterbi detector (124) to a data frame of the data code based upon the synchronization signal (Table 2).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the Viterbi detector while maintaining substantially the same functionality without departing from the scope and spirit of the present invention. In addition, although the preferred embodiment described herein is directed to a Viterbi detector for a storage system, it will be appreciated by those skilled in the art that the teachings of the present invention can be applied to other systems, like data transmission or communication systems, without departing from the scope and spirit of the present invention. Further, although the invention has been described in terms of circuits, the invention may be implemented in hardware, software or their combination as desired.

What is claimed is:

1. A method of synchronizing a Viterbi detector to data frames corresponding to code words read from a medium, the method comprising steps of:
   (a) providing a timing pattern;
   (b) providing a synchronization pattern in the timing pattern having a plurality of features;
   (c) synchronizing the Viterbi detector to the synchronization pattern based upon the timing pattern; and
   (d) synchronizing the Viterbi detector to the data frame based upon based upon identification of the plurality of features in the synchronization pattern.

2. The method of claim 1 including a time varying trellis in the Viterbi detector.

3. The method of claim 2 wherein the synchronizing step (d) comprises synchronizing the time varying trellis to the data frames based upon the synchronization pattern.

4. The method of claim 1 wherein the timing pattern comprises a sequence of alternating bit pairs, each bit pair comprising two bits of the same value.

5. The method of claim 1 wherein the Viterbi detector comprises a radix-4 Viterbi detector.

6. The method of claim 1 wherein the synchronizing step (c) comprises detecting polarity of the timing pattern.

7. The method of claim 6 wherein synchronizing to the timing pattern further comprises inserting a temporary offset in the timing pattern to align the detector with the bit pairs.

8. The method of claim 6 wherein synchronizing to the timing pattern further comprises determining the phase of the timing pattern.

9. The method of claim 8 wherein the timing pattern has four possible phases.

10. The method of claim 8 wherein synchronizing to the synchronization pattern comprises biasing the Viterbi detector based upon the phase of the timing pattern.

11. The method of claim 1 implemented in a disc storage system.

12. The method of claim 1 wherein the identification of the features is a function of an XOR.

13. The method of claim 1 wherein the synchronization pattern includes four distinguishing features.

14. The method of claim 1 wherein the features are separated by at least two bits.

15. The method of claim 14 wherein the at least two bits directly correspond to the timing pattern.

16. The method of claim 1 wherein the synchronization pattern is at least 30 bits.

17. An apparatus for synchronizing a Viterbi detector to a time varying data code read from a medium, comprising:
   timing pattern synchronization circuitry adapted to determine a phase of a timing pattern in the data code;
   synchronization signal detection circuitry operatively coupled to the timing pattern synchronization circuitry, adapted to identify a synchronization contained in the timing pattern signal containing a plurality of features in the data code based upon the phase of the timing pattern; and
   data frame synchronization circuitry operatively coupled to the detection circuitry, adapted to synchronize the Viterbi detector to a data frame of the data code based upon identification of the plurality of features in the synchronization signal.

18. The apparatus of claim 17 wherein the Viterbi detector includes a time varying trellis.

19. The apparatus of claim 18 wherein the time varying trellis is synchronized to data frames by the data frame synchronization circuitry.

20. The apparatus of claim 17 wherein the timing pattern comprises a sequence of alternating bit pairs, each bit pair comprising two bits of the same value.

21. The apparatus of claim 17 wherein the Viterbi detector comprises a radix-4 Viterbi detector.

22. The apparatus of claim 17 wherein the synchronization signal detection circuitry detects polarity of the timing pattern.

23. The apparatus of claim 17 wherein synchronization signal detection circuitry further detects phase of the timing pattern.

24. The apparatus of claim 17 implemented in a disc storage system.

25. The apparatus of claim 17 wherein the data frame synchronization circuitry includes an XOR and the identification is a function of the XOR.

26. The apparatus of claim 17 wherein the synchronization signal includes four distinguishing features.

27. The apparatus of claim 26 wherein the features are separated by at least two bits.

28. The apparatus of claim 17 wherein the synchronization signal is at least 30 bits.

29. An apparatus for synchronizing a Viterbi detector to a time varying data code read from a medium, comprising:
- means for determining a phase of a timing pattern in the data code;
- means for identifying a synchronization signal in the timing pattern; and
- means for synchronizing the Viterbi detector to a data frame of the data code.

* * * * *

UNITED STATES PATENT AND TRADEMARK OFFICE
CERTIFICATE OF CORRECTION

PATENT NO. : 6,493,162 B1
DATED : December 10, 2002
INVENTOR(S) : Fredrickson

It is certified that error appears in the above-identified patent and that said Letters Patent is hereby corrected as shown below:

<u>Column 12,</u>
Line 11, "$\leqq$" should be -- $\leq$ --

Signed and Sealed this

Seventeenth Day of August, 2004

JON W. DUDAS
*Acting Director of the United States Patent and Trademark Office*